United States Patent [19]

Takeuchi

[11] 3,858,797

[45] Jan. 7, 1975

[54] INSPECTION DEVICE IN CARD READERS

[76] Inventor: Tetsuo Takeuchi, 7, Tatsumidai Nishi 3-chome, Ichiharashi, Chiba, Japan

[22] Filed: July 25, 1973

[21] Appl. No.: 382,526

[52] U.S. Cl. ........ 235/61.11 R, 235/11 E, 271/8 A, 250/569

[51] Int. Cl. ...... G06k 13/08, G06k 7/10, B65h 7/00

[58] Field of Search...235/61.11 D, 61.11 E, 61.7 B, 235/61.11 R, 61.12 N; 271/74, 8 A; 250/219 DC, 569; 340/149 A; 88/24

[56] References Cited

UNITED STATES PATENTS

| | | | |
|---|---|---|---|
| 1,290,509 | 1/1919 | Chandler | 271/8 A |
| 1,883,307 | 10/1932 | Livingston | 271/8 A |
| 2,787,190 | 4/1957 | McWhirter | 88/24 |
| 3,216,317 | 11/1965 | Nail | 88/24 |
| 3,611,292 | 10/1971 | Brown | 340/149 R |
| 3,745,314 | 7/1973 | Mathias | 235/61.11 E |

*Primary Examiner*—Daryl W. Cook
*Assistant Examiner*—Robert M. Kilgore
*Attorney, Agent, or Firm*—Howson and Howson

[57] ABSTRACT

A card inspecting device in the card reader used as the numerical control device in which cards are arranged in the vertical position in the card magazine and beam from the surface of the card is refracted by the prism so that the letters on the card can be viewed by the operator.

1 Claim, 1 Drawing Figure

PATENTED JAN 7 1975 3,858,797
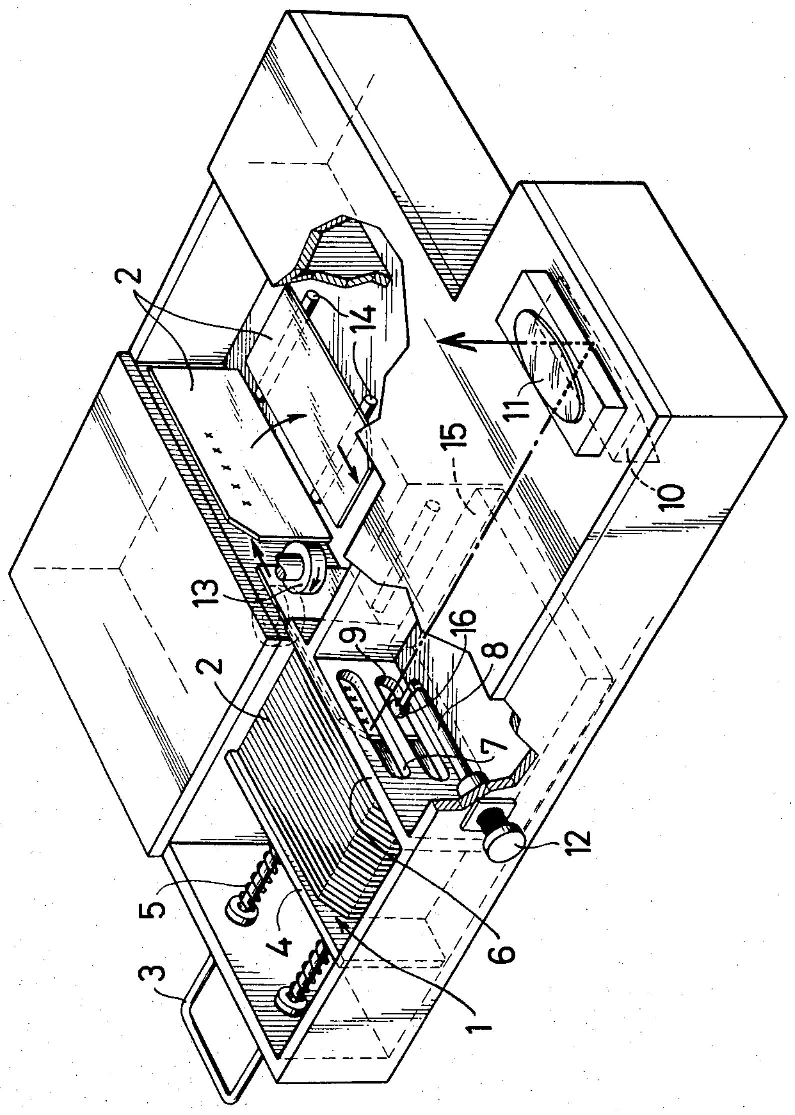

INSPECTION DEVICE IN CARD READERS

The present invention relates to a device for inspecting a card in a card reader used in for example numerical control device.

In conventional card readers, cards are stacked in the card magazine, and the lowermost card is fed from the card magazine. For this reason, it is impossible to read contents of the card. Frequently it is necessary to confirm contents in the case of a control card in the numerical control device. For this purpose, there has been provided an indicating device which reads the card at first, and indicates the contents on a photoelectric indicator on an operation board or the like. This device is expensive, and moreover it it difficult to indicate all of contents.

Accordingly, the object of the present invention is to provide a device which can read the card directly by human eyes by enlarging the letter printed on the card. For this purpose, according to the present invention, the device is so adapted that the card is accommodated in a magazine in the vertical position and that the printed letters on the topmost card of the card block can be observed.

Describing now the device according to the present invention referring to the attached drawing, in which an embodiment of the present invention is perspectively shown, a plurality of cards 2 are accommodated in a card magazine 1 with the paper surface held vertical, a pushing plate 4 on which a handle 3 is provided is urged to the card block by a spring 5, so that the card block is pushed against the front plate 6. A window 7 for exposing letters printed on the card surface and a window 9 for a delivery bar 8 are provided in the front plate 6. A triangular prism 10 and a magnifying lens 11 are provided at the end of the casing, thereby the letters on the topmost card can be viewed by the operator through the triangular prism 10 and the magnifying lens 11. Thereafter, by pushing a push button 12 for feeding card, a rubber feeding member 16 provided at the end of the delivery bar 8 is moved to feed the topmost card, and the card is delivered by means of a pair of feeding roller 13. The card is then thrown down as shown by the arrow, placed on a delivery roller 14, and is carried to an entrance 15 of the card reader.

As is clear from the above description, according to the present invention, it is possible to view the letters on the card surface with an extremely simple device. The surface of the card can be seen more easily if it is illuminated by an appropriate light source.

What is claimed is:

1. An inspection device for a card reader of the type having an automatic card reading station, comprising a magazine for accommodating a stack of cards on edge in the vertical position and having a vertical front plate for retaining said stack, a push plate pushing the stack against said front plate of the magazine, card feed means for delivering cards one by one from the front of said stack to said card reading station, a window provided in said front plate for exposing indicia on the front surface of each of the cards, an optical prism exposed to said indicia through said window and diverting light therefrom in an upward direction, and a horizontally disposed enlarging lens positioned above said prism for producing a visually observable image of said indicia at a position above said lens.

* * * * *

UNITED STATES PATENT OFFICE
CERTIFICATE OF CORRECTION

PATENT NO. : 3,858,797
DATED : January 7, 1975
INVENTOR(S) : Tetsuo Takeuchi

It is certified that error appears in the above-identified patent and that said Letters Patent are hereby corrected as shown below:

On the first or Abstract page, below [76] Inventor:

Tetsuo Takeuchi, 7, Tatsumidai Nishi 3-chome, Ichiharashi, Chiba, Japan, add

-- [73] Assignee: Mitsui Shipbuilding and Engineering Co. Ltd. Tokyo, Japan -- and -- [30] Foreign Application Priority Data Aug. 10, 1972 Japan ....... 80568/1972 --

Signed and Sealed this

*twenty-fifth* Day of *May 1976*

[SEAL]

*Attest:*

RUTH C. MASON
*Attesting Officer*

C. MARSHALL DANN
*Commissioner of Patents and Trademarks*